Patented Aug. 1, 1939

2,167,859

UNITED STATES PATENT OFFICE 2,167,859

PROCESS FOR THE MANUFACTURE OF IRON, STEEL, AND FERROUS ALLOYS FROM PIG IRON

George William Willis, Brighton, England

No Drawing. Application October 13, 1937, Serial No. 168,845. In Great Britain April 15, 1936

4 Claims. (Cl. 75—54)

The invention relates to the manufacture of iron, steel and ferrous alloys from pig iron.

According to the invention molten pig iron (to which alloying ingredients or steel scrap may have been added) is heated to an elevated temperature which for most practical requirements is 1600–2000° C. according to the final carbon content desired, and then treated firstly with sodium sulphate and subsequently, preferably after reheating to or above the original temperature, with limestone. The molten metal produced is ready to be cast.

The sodium sulphate and limestone may each suitably be employed in quantities of between 4 and 8 lbs. per 1 cwt. of molten pig iron.

The higher the temperature employed, the greater the reduction of carbon content, and the molten metal produced, after casting, may be of any grade between a hard carbon steel and a soft almost pure iron. Cast metal containing practically no free carbon may be produced. It can be hammered or rolled even when the total carbon content is high, this being facilitated by the addition of a little scrap steel to the melt. Furthermore it may be hardened by heating to 800–900° C. and quenching in oil or water.

When it is desired to convert the pig iron into steel alloys, alloying materials, e. g., nickel, chromium or tungsten may be added. A very small proportion of chromium renders it stainless.

The alloying ingredients may either be melted with the metal, or introduced in the solid or molten state into the molten metal before or during the treatment or at any stage after the treatment of the metal but prior to the solidification thereof.

The invention is illustrated by the following examples:

Example 1

For the manufacture of directly cast tools a pig iron of the following analysis—

| | Per cent |
|---|---|
| Total carbon | 2.80 |
| Silicon | .45 |
| Sulphur | .118 |
| Phosphorus | .037 |
| Manganese | .18 |
| Chromium | .026 | is melted in a natural draught pit furnace. When the metal is in a molten state 1% tungsten is added and the temperature is brought up to 1600° C. which takes about 1½ hours. To 28 lbs. of this pig 1¼ lbs. of sodium sulphate is added and after waiting for the metal to return to its original temperature or slightly above it 1¼ lbs. of limestone is added. The temperature is then brought up to 1650° C. The metal is then drawn, skimmed, poured into moulds and allowed to cool. The metal is malleable and can be drilled. The analysis of the cast metal is as follows—

| | Per cent |
|---|---|
| Total carbon | 2.67 |
| Silicon | .19 |
| Sulphur | .118 |
| Phosphorus | .042 |
| Manganese | .10 |
| Chromium | .026 |
| Tungsten | 1.00 |

The tools are then ground, heated at 600° C. and oil quenched. Tools of any shape may be cast. Milling cutters, reamers, lathe tools, etc., can be tempered to glass hardness.

Example 2

A chilled pig iron of the following analysis is employed as starting material—

| | Per cent |
|---|---|
| Total carbon | 3.20 |
| Silicon | .65 |
| Sulphur | .1 |
| Phosphorus | .06 |
| Manganese | .25 |

To 28 lbs. of this pig, 6 lbs. of Swedish cut scrap steel is added and the whole melted in a natural draught pit furnace. The temperature is raised to 1650° C. and 1½ lbs. of sodium sulphate is added. After a period of 20 minutes has been allowed for the sodium sulphate to act 1½ lbs. of limestone is added and the temperature is brought up to 1700° C. The metal is then drawn and cast into ingots or billets which are allowed to cool.

For rolling, the ingot or billet is placed into a slow oven and allowed to warm through, it is then placed in a high temperature furnace and brought up to a blood red heat ready for rolling. The final total carbon content in the rolled sheet is 0.055%.

This metal, which is free from graphite, is suitable for sheet work in the motor and like trades.

What I claim is:

1. A process for the manufacture of iron, steel and ferrous alloys, which process comprises the steps of treating a molten pig iron at a temperature of 1600–2000° C. firstly with sodium sulphate and then with limestone and finally casting the treated metal.

2. A process for the manufacture of malleable ferrous alloys, comprising treating molten metal comprising predominantly pig iron at a temperature of from 1600° C. to 2000° C. firstly with sodium sulphate and then with limestone, fixing the final total carbon content at not less than 2%, and casting the treated metal.

3. A process for the manufacture of malleable ferrous alloys, comprising treating molten metal comprising predominantly pig iron at a temperature of from 1600° C. to 2000° C. with sodium sulphate, reheating the metal to a temperature at least as high as the temperature before the sodium sulphate treatment, then treating the metal with limestone, and then casting the treated metal.

4. A process for the manufacture of malleable ferrous alloys, comprising treating molten metal comprising predominantly pig iron at a temperature of from 1600° C. to 2000° C. firstly with sodium sulphate in the proportion of from four to eight pounds per hundredweight of metal, and then with limestone in the proportion of from four to eight pounds per hundredweight of metal, and then casting the treated metal.

GEORGE WILLIAM WILLIS.